May 5, 1964 W. T. RENTSCHLER 3,131,618
PHOTOGRAPHIC CAMERA
Original Filed Jan. 28, 1960 2 Sheets-Sheet 1
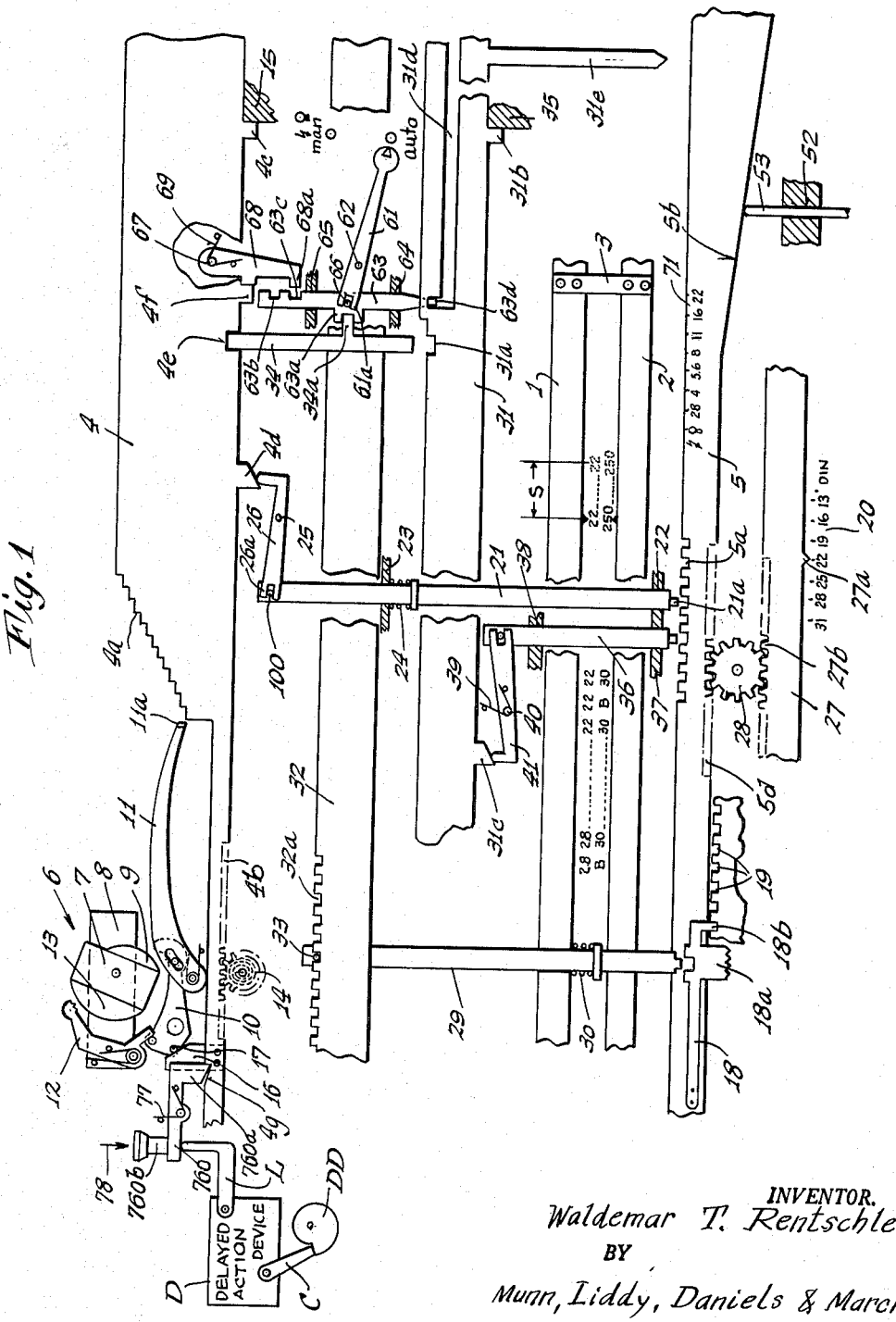
INVENTOR.
Waldemar T. Rentschler
BY
Munn, Liddy, Daniels & March
ATTORNEYS

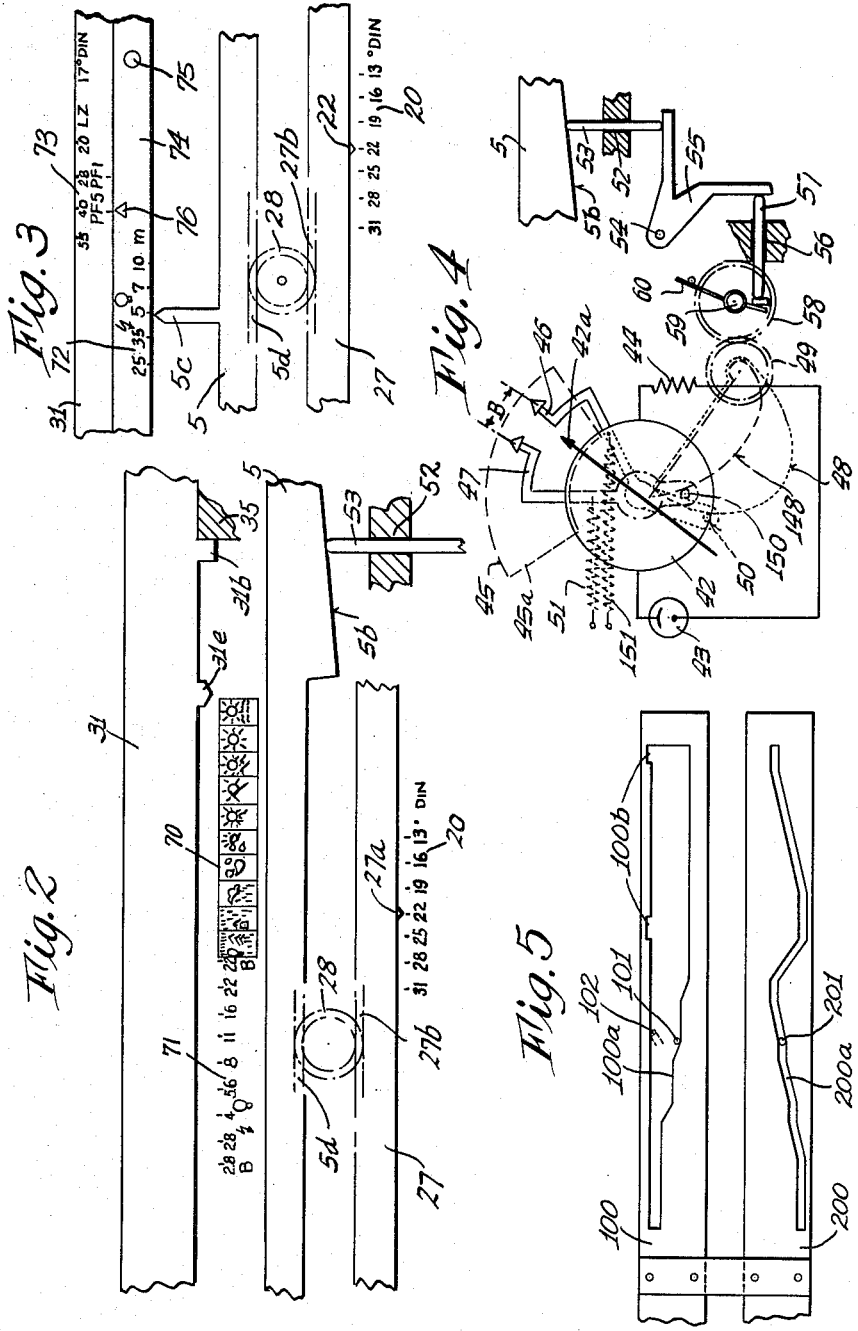

United States Patent Office 3,131,618
Patented May 5, 1964

3,131,618
PHOTOGRAPHIC CAMERA
Waldemar T. Rentschler, Calmbach (Enz), Germany, assignor to Alfred Gauthier, G.m.b.H., Calmbach (Enz), Germany, a corporation of Germany
Continuation of application Ser. No. 5,133, Jan. 28, 1960.
This application Apr. 9, 1962, Ser. No. 188,601
Claims priority, application Germany Jan. 31, 1959
18 Claims. (Cl. 95—10)

This invention relates to photographic cameras of the type wherein settable diaphragm and exposure time (shutter speed) setting members are coupled to each other in a fixed relation which correlates the speed and diaphragm values in such a manner that there is defined a closed setting range characterized by uniform exposure value gradations.

This application is a continuation of my copending application Serial No. 5,133 filed January 28, 1960 and entitled Photographic Camera, and now abandoned.

It is an object of the present invention to provide a camera of the above type, wherein fully automatic exposure settings can be effected, taking into account additional exposure factors (other than the factor of light intensity) all in a simple, clearly visible and easily understandable, functionally reliable manner, and wherein especially the setting for the additional exposure factor or factors does not require alteration of the mode of operation of the automatic exposure setting device which is utilized.

The invention solves this problem by an organization wherein, for the purpose of automatically effecting the exposure setting in response to operation of a light intensity measuring device the fixedly coupled diaphragm and speed setting members as a unity are releasably connected to a third (so called) setting member which is under the control of the light intensity measuring device and is actuated by a powered driving device, and wherein for the purpose of taking into account additional exposure factors other than the factor of light intensity, as for example the factor of film sensitivity, a fourth setting member is provided which normally remains stationary with relation to the automatic adjustment of the speed and diaphragm setting members and which fourth setting member is connectable to the speed and diaphragm setting members only for the purpose of carrying out the initial setting operation. The said fourth setting member will be also referred to hereinafter as the "film sensitivity setting member."

A camera as thus constructed in accordance with the invention has a number of important advantages. In considering these it may be first stressed that all of the settable exposure factors with the exception of the light intensity are associated with the said third setting member which is under the control of the light intensity measuring device, so that the setting of said third setting member as effected by the light intensity measuring device is in accordance with genuine light values. This means that the same position of the said third setting member is always correlated with specific light intensity values, regardless of the pre-settings effected on the camera. This is very advantageous as regards the construction and arrangement of the light intensity measuring device, since it is possible to use for such instrument a moving coil type unit of any characteristic whatsoever. Other advantages of a camera as constructed in accordance with the invention reside in the fact that the said fourth setting member, which is associated with exposure factors other than light intensity, is connected to the diaphragm and speed setting members only for the purpose of effecting a setting process, while no such connection exists during the remaining time. This has the desirable result that the said fourth setting member is not moved during the automatic exposure setting operation, which therefore may be carried out with a minimum amount of driving energy since only relatively small masses need be shifted.

A further construction as provided by the invention results in special advantages with respect to versatile use (utilizability) of the camera while at the same time there is obtained a simple and favorable organization which is functionally reliable and is characterized by a simple and easily understood mode of operation. This further construction provides, for the purpose of selecting either a manual or else an automatic exposure setting (which letter is responsive to actuation of the light intensity measuring device) alternatively operable releasable couplings by which the diaphragm and speed setting members as a unit can be connected either to a manually operable setting member or else to the said third setting member which is controlled by the light intensity measuring device.

The operability and mode of operation of a camera constituted in this manner is both extremely simple and reliable, for it requires merely the alternating or switching of mechanical couplings in order to select either the manual setting operation or else the automatic setting operation, the latter utilizing the light intensity measuring device. There is no reciprocal effect between the automatic and manual setting devices, and it is to be especially noted that the coupled speed and diaphragm setting members, the manually operable setting member and also the said third setting member which is controlled by the light intensity measuring device are all separate, clearly organized structural groups. These groups impose no conditions on each other, and can therefore be freely arranged and constructed, making for an extremely flexible organization.

In a camera as above constructed there may be had not only the above mentioned advantages but additionally other exposure factors different from that involving light intensity may be taken into consideration, by the use of a simple transmission member which is inserted in the coupling connection between the unitized or unitary speed and diaphragm setting members on the one hand and the manually operable setting member and said third setting member on the other hand, the unitized speed and diaphragm setting members being connectable to the transmission member in different relative positions and the latter being connectable by means of releasable couplings alternately either to the manually operable setting member or else to the said third setting member (which is controlled by the light intensity measuring device).

Optimal operational simplicity and reliability with respect to the successful taking of photographs can further be obtained by the provision of a simple indicating or warning device which may apprise the user of the suitability of prevailing light conditions for exposure settings which are within the operating range of the camera, considering the particular film sensitivity which is to be worked with. Such indicating or warning device cooperates with the light intensity measuring device and is preferably visible in the view finder. The indications of the warning device are changeable in response to adjustment of the camera for different film sensitivities.

The special advantage of this further construction as provided by the invention resides in the fact that except for aiming the camera at the object to be photographed and possibly setting the distance, the operator need do nothing more in order to obtain a successful photograph than observe whether or not the indicating or warning device shows an acceptable or else a non-acceptable circumstance.

The said indicating or warning device may be constructed in different ways. Embodiments of such devices are known per se. However, according to the invention there is provided an especially easily understood indicator means of simple structure which is characterized by a reliable mode of operation, in the form of a well-known galvanometer having a needle which is movable in a viewing window, in conjunction with two movable limiting marks or members which are also visible in the said window. The different spacings and positions of the said limiting members are effected by control devices connected between the members and the film sensitivity (fourth) setting member, such control devices being constituted as cams which are matched to the characteristic of the galvanometer in such a manner that they define, as represented by the positions of the space between the limiting members, the permissible operating range of the camera. This simplified, specific indicating or warning means constitutes an important feature of the invention.

In order to adapt the camera, in accordance with the invention, to a wide range of film sensitivities in a simple and economical manner, the fixedly coupled speed and diaphragm setting members are made to have an additional path of movement or range in order to include films having a sensitivity which exceeds the upper limit of the operating range of the camera. For such overpath or additional range of the coupled speed and diaphragm setting members, the values of diaphragm and speed remain fixed and have the same value which is associated with the upper limit of the operating range. The size of the overpath, that is, the extent of the additional range, is then determined by the number of the film sensitivity values in excess of the film sensitivity limit.

An effortless and readily understandable method of operating the camera with a view to establishing the coupling connections the camera with a view to establishing the coupling connections between the unitized speed and diaphragm setting members on the one hand and either the manually operable setting member or the said third setting member on the other hand is obtained by the use of a selector device which normally remains in a fixed location as regards the movement of the speed and diaphragm setting members. The selector device can be placed in either of two positions, an automatic position and a manual position labelled respectively "auto" and "man." In the "auto" position, the selector device connects the said third setting member to the transmission member, whereas in the "man" position the selector device connects the manually operable setting member to the transmission member.

By arranging the selector device so that is is in a stationary or fixed location there is the advantage that it always occupies the same position on the camera, which facilitates the finding and gripping of the device.

In accordance with the invention as set forth in another embodiment thereof, the camera can not only be used for daylight exposures but also for flash exposures, and this is accomplished by providing a special setting range which is associated with the manually operable setting member, the said range having an exposure time which is suited for flash exposures, in association with the entire range of diaphragm values.

In order to enable the operator easily and simply to set the right diaphragm value without there existing a diaphragm identification and without knowledge of the size of the diaphragm aperture which is associated with the different setting positions of the manually operable setting member there is provided an auxiliary range or distance scale and also an identification mark scale for flash lamp types, the said scales being relatively adjustable and referable one to the other. One of said scales may be arranged on the manually operable setting member while the other is disposed on the said fourth or film sensitivity setting member. Or, alternatively, both scales may be disposed on the film sensitivity member in which latter case for the purpose of setting the manually operable setting member at a position corresponding to the type of flashbulb used and the photographic distance or range which is selected, an index mark is provided on the manually operable setting member, for cooperation with the scales for distance and flash lamp types carried by the said fourth setting member. Where the scales are respectively arranged on the fourth and manually operable setting members they are arranged to be cooperable with each other, in effecting the setting for distance and flashbulb type.

An embodiment of the invention is described below and is illustrated diagrammatically by the accompanying drawings. Other features and advantages of the invention will also become apparent from the said description and drawings.

FIG. 1 is a diagrammatic representation of a camera setting means as provided by the invention. The operative connections of the different setting members are illustrated in this figure, and the positions occupied are those wherein the device is in readiness for effecting a fully automatic exposure setting.

FIG. 2 is a diagrammatic representation illustrating the arrangement and construction of the setting scales associated with the manually operable setting member.

FIG. 3 is a diagrammatic representation of an arrangement of scales which is different from that of FIG. 2, and which provides for a manual setting in connection with flash exposures.

FIG. 4 is a diagrammatic representation illustrating an indicating or warning device as provided by the invention, and illustrating the mode of operation of such device.

FIG. 5 illustrates a diagrammatic showing of the control device for exposure time and diaphragm.

Referring now to FIG. 1, the numerals 1 and 2 indicate respectively the exposure time or speed setting member and the diaphragm setting member of a photographic camera. The above two setting members of the photographic camera are rigidly permanently connected to each other to constitute a unitary setting device, by means of a cross rail 3. The relative secured positions of the setting members 1 and 2 provide a fixed combination between speed and diaphragm values which in conjunction with cam or equivalent control devices coupled with the setting members and with the diaphragm and shutter speed control, enable a closed setting range to be obtained, having a uniform exposure value gradation. Cam control devices for effecting this are illustrated and described in my copending application Serial No. 839,819 filed September 14, 1959 and entitled "Photographic Camera" now Patent No. 3,022,714 such application and the present application having common ownership. As described therein and with references to FIG. 5, the control device includes two slides 100 and 200 which are fixedly connected (in a manner not shown) to the setting members 1 and 2 for exposure time and diaphragm. The slide 100 comprises a cam 100a, with which a pin 101 of a per se known exposure time escapement mechanism cooperates. In addition, the member 100 comprises two openings (recess) 100b with which the arm 102 of a B-arresting lever cooperates in a manner known per se. The slide 200 associated with the diaphragm setting member 2 also carries a control slot 200a which is engaged by a pin 201 connected to the diaphragm mechanism of the camera in a manner not shown in FIG. 5. The cams 100a and 200a are so developed and mutually adjusted that a correlation of time and diaphragm values is obtained in a manner described herein. Given a diaphragm setting range of from 2.8 to 22 and an exposure time or speed setting range of from 1/30 sec. to 1/250 sec., these values may be correlated for example, in the following manner:

| Exposure Time: | Diaphragm |
|---|---|
| 30 | 2.8 |
| 60 | 2.8 |
| 60 | 4 |
| 60 | 5.6 |
| 125 | 5.6 |
| 125 | 8 |
| 125 | 11 |
| 250 | 11 |
| 250 | 16 |
| 250 | 22 |

For the purpose of automatically effecting an exposure setting in response to the operation of a light-intensity measuring device, the invention provides a releasable coupling or connection between the two fixedly coupled speed and diaphgram setting members 1 and 2 and a third setting member 4 which is controllable by the light intensity measuring device and is movable by means of a powered driving mechanism. Also for the purpose of setting or including additional exposure factors other than the light intensity, as for example the exposure factor of film sensitivity, there is provided a fourth setting member 5 which normally remains stationary or fixed with respect to the automatic adjusting movement of the speed and diaphragm setting members 1 and 2 and is connectable to the said fixedly related members only for the purpose of effecting the setting operation. The fourth setting member 5 will hereinafter also be called the "film sensitivity member."

The light intensity measuring device, by means of which the third setting member 4 is controlled, can be constructed in any well-known or proposed manner.

In the illustrated embodiment of the invention, the light intensity measuring device comprises a well-known galvanometer 6 which is energized by the current from a photocell (not shown for reasons of clarity of illustration). The moving coil 7 of the galvanometer 6 is rotatably mounted on a supporting or carrier member 8 and has a cam portion 9 cooperable with a pivotally mounted two-part lever 10 for the purpose of feeling out or sensing the respective deflected positions of the moving coil 7 as determined by the light intensity.

In order to transmit the said respective positions of the moving coil 7 (as communicated to the sensing lever 10) to the third setting member 4, another pivotally mounted lever 11 is provided, being cooperably connected to the lever 10 in the manner shown in FIG. 1. One end portion 11a of the lever 11 is adapted to cooperate with a stepped setting curve or edge 4a provided on the third setting member 4.

For the purpose of securing the moving coil of the galvanometer 6 in its various adjusted positions during the sensing operation, the sensing lever 10 has a tensional and unidirectionally positive connection with a pivotally mounted lever 12 which cooperates with a cam member 13 on the moving coil 7. The motions of the two levers 10 and 12 are reciprocally so adjusted that the contact or sensing lever 10 does not engage the moving coil 7 until after the moving coil has been engaged and locked in position by the fixing or locking lever 12. In the diagram of FIG. 1, the third setting member 4 is shown in a starting position which is associated with a stressed or cocked state of a powered driving device 4b, 14 acting on it. In this position of the setting member 4, a stop 4c carried by the setting member abuts a stationary stop 15 of the camera. In order to insure for this position freedom of movement of the galvanometer coil 7 in accordance with the prevailing light intensity, the two levers 10 and 12 are disengaged from the irrespective cams 9 and 13. This is accomplished by the provision of a camming member 16 provided on the setting member 4 and cooperating with a pin 17 affixed to the lever 10 whereby the two levers 10 and 12 are pivoted into the positions shown in FIG. 1 slightly before the third setting member 4 has reached its initial or starting position.

The setting member 4 carries out an adjusting movement from right to left under the action of the driving device 4b, 14. At the initiation of such movement of the cam member 16 becomes disengaged from the pin 17 whereupon the contact lever 10 is free to be adjusted to a specific position as determined by the deflection of the moving coil 7 of the galvanometer, such adjusted position corresponding to the prevailing light intensity. Depending upon the position of the contact lever 10 the setting member 4 is halted during its right-to-left adjusting movement by engagement of one of the shoulders of the stepped edge 4a with the abutment lug 11a provided on the end of the lever 11. It will be understood that the lever 11 assumes different angular positions as determined basically by the light intensity. The lowest step of the stepped edge 4a corresponds to the maximum light value, and the highest step corresponds to the minimum value of the light intensity that can be indicated by the light intensity measuring device 6. The correlation of these values with the steps of the curve or edge 4a is always the same, regardless of the film sensitivity setting determined by adjustment of the fourth setting member 5.

The above described light intensity measuring device and the adjustable mechanism controlled thereby for halting the third setting member 4 may be constructed in accordance with the disclosure of U.S. Patent application Ser. No. 745,159, filed June 27, 1958, now Patent No. 3,004,481. The exposure setting ring mentioned in the said application corresponds to the third setting member 4 of the present application. However, the light intensity measuring device may be constructed as regards its details, the result will always be the same in that the same path or extent of movement of the setting member 4, measured from its starting position, will be associated with given, specific (existing) light values. This arrangement and the connection between the speed and diaphragm setting members 1 and 2 on one hand and the said third setting member 4 which is controlled by the light intensity measuring device on the other hand, as well as the kind of film sensitivity setting, produces in a camera as constructed in accordance with the invention, clear easily understood conditions which result in a simple structure and reliable operation of the device.

These advantages are obtained regardless of the special or specific construction of the various setting members, which in the figures are drawn in the form of slides for the sake of clarity of illustration. Instead of being shaped like slides, the setting members may have annular configurations, thereby being adapted to the structural conditions of well-known cameras.

In order to combine the above described mode of operation of the camera with the greatest possible operational reliability, the invention further provides locking devices which permit the said fourth (film sensitivity) setting member to be adjusted only when the coupling connection between the unitized speed and diaphragm setting members 1, 2 and the said third setting member 4 is disengaged with the latter setting member occupying the starting position as shown in FIG. 1 which is associated with the stressed or cocked position of its driving device 14, 14b.

The locking devices provided, as illustrated in the embodiment of the invention, comprise two arresting or detent means. One of these is releasable in response to the release of the coupling connection between the unitized speed and diaphrgam setting members 1, 2 on the one hand and the said third setting member 4 on the other hand, whereas the other detent or arresting means is released in response to the said third setting member 4 reaching its initial or starting position as shown in FIG. 1.

The movable member of the first-named arresting or locking device comprises a flexible arm 18 fixed to the fourth setting member 5 and having a fingerpiece 18a. The arm 18 when not depressed engages by means of a locking lug 18b detent recesses or notches 19 provided on a stationary part of the camera. The division or spacing of the said locking notches 19 is correlated with the graduations of a setting scale 20 provided on the camera for use in conjunction with the sensitivity setting member 5 and which has film sensitivity values.

The second-named arresting or locking means comprises a movable pin 21 which is longitudinally shiftable in guides 22 and 23 provided on a side of the camera case. The locking pin 21 has a lug 21a at one end which, under the action of a compression coil spring 24, is made to engage detent recesses or notches 5a provided on the film sensitivity setting member 5 and having the same graduations and spacing as the locking notches 19. The other end of the pin 21 has a pin-and-slot connection 100, 26a with a two-armed lever 26 which is pivoted about a pin 25 on the camera case and which cooperates with a cam 4d provided on the third setting member 4. This cooperation is such that when the starting position of the said setting member 4 (which position is associated with the cocked condition of the driving means 4b, 14 is attained the cam 4d engages the lever 26 and causes the latter to pivot clockwise whereupon the pin 21 will be raised as viewed in FIG. 1 and disengaged from the locking notches 5a of the said fourth setting member 5.

When the flexible blade 18 is actuated, as its arresting lug 18b becomes disengaged from the locking notches 19 an adjustment of the said fourth setting member 5 can now be effected for the purpose of setting for film sensitivity.

A setting member 27 having an index or indicator mark 27a is provided, connected through gears 27b, 28 and 5d with the fourth setting member 5, the member 27 serving to indicate on the sensitivity scale 20 the adjusted position of the film sensitivity setting member 5.

In accordance with the invention there is provided a longitudinally shiftable pin 29 for the purpose of coupling the unitized speed and diaphragm setting members 1, 2 to the said third setting member 4 which is responsive to light values. The pin 29 is slidably mounted on the setting members 1 and 2 and is maintained in operable position by means of a compression coil spring 30, in a manner to be described later. Upward shifting of the pin 29 against the action of the spring 30 for the purpose of releasing the coupling connection between the unitized setting members 1 and 2 on one hand and the said third setting member 4 on the other hand is effected by means of the flexible blade 18 and occurs during the release of the locking device 18, 19 provided in connection with the film sensitivity setting member 5. When the flexible blade 18 is actuated or shifted upward as seen in FIG. 1, the said locking device and the coupling device are mutually adjusted in such a manner that release of the coupling is effected prior to the release of the locking device. This release reliably eliminates any possibility of the coupling pin 29 actuating the said third setting member 4 during adjustment of the film sensitivity member 5.

To provide for a versatile use of the camera in accordance with the invention, it is of advantage if an exposure setting can be effected not only automatically in response to the prevailing light intensity but also manually, where this should be desired or required.

Also, further in accordance with the invention the effecting of either an automatic or a manual setting may be accomplished in a simple manner which provides a clear and readily understandable structure and reliable mode of operation of the device. In accomplishing this, the unitized speed and diaphragm setting members 1 and 2 are, for the purpose of effecting either a manual or else an automatic setting of the camera, connected by means of releasable couplings either to a manually operable setting member 31 or else to the said third setting member 4 which is controlled by the light intensity.

To effect a film sensitivity setting with such an arrangement, as provided by the invention, an intermediary or transmission member 32 is arranged for insertion in the coupling connection between the unitized setting members 1 and 2 on one hand and the said manually operable setting member 31 or the said third setting member 4 on the other hand. Also, the unitized setting members 1 and 2 are connectable to the said transmission member in different relative positions, and such transmission member is connectable by means of releasable couplings alternately to the manually operable setting member 31 or else to the said third setting member 4.

The above mentioned coupling pin 29 which is displaceable in response to release of the arresting device 18, 19 is utilized, in the illustrated embodiment of the invention, for the purpose of coupling the unitized speed and diaphragm setting members 1 and 2 to the transmission member 32. For this purpose, the pin 29 is provided with a locking finger or lug 33 which engages, under action of the spring 30, locking notches 32a which are provided on the transmission member 32 and are correlated with the gradations of the film sensitivity scale 20.

The alternate coupling of the transmission member 32 to either the manually operable setting member 31 or else to the said third setting member 4 is brought about by means of a rail or slide bar 34 which is shiftably mounted on the transmission member and is alternately engageable with the setting members 4 and 31 when these latter are in their starting positions. The slide bar 34 is receivable in recesses 4e or 31a provided respectively in the two setting members 4 and 31, and is shiftable by means of an actuating or selector device which will be described in detail below.

In order completely and reliably to eliminate errors in the method of operating the above described camera, there is further provided by the invention an additional locking device which permits adjustment of the film sensitivity setting member 5 only if the manually operable setting member 31 is in a specific starting position. FIG. 1 shows this starting position of the member 31, wherein the said member is positioned by a counterstop 35 and fixedly mounted on the camera engaged with a stop lug 31b provided on the setting member. The said starting position of the manually operable setting member corresponds to the starting position of the said third setting member 4 which is responsive to the light intensity and which corresponds to the stressed or cocked condition of the driving device 4b, 14.

The said additional locking device is constructed in a general manner similar to the locking means 18, 19 and 5a, 21. It comprises a pin 36 which is displaceable in stationary guides 37 and 38 provided on the camera and which pin engages under the action of a spring 39 the locking notches 5a already provided for the pin 21, 21a on the film sensitivity member 5.

The pin 36 is disengaged from the locking notches 5a automatically in response to attainment by the manually operable setting member 31 of its starting position as shown in FIG. 1. In accomplishing this, the setting member 31 is provided with a cam lug 31c which is engageable with a two-armed lever 41 pivotally mounted about an axis 40 on the camera, the said lever having a pin-and-slot connection with the slide bar or locking pin 36.

FIG. 4 shows in conjunction with FIG. 1 an additional construction of the invention which results in a particularly easy and understandable adjustment of the camera, by which photographs are reliably produced. This results from the provision of a novel indicating and warning device which is responsive to the prevailing light conditions and which indicates, preferably in the view finder of the camera, whether or not an exposure setting may be automatically effected within the operating range of the camera at the prevailing light intensity and in view of the sensitivity of the film which is being used. The relative positions of the indicator members or parts of the indicating and warning device with respect to the needle or deflection part of the light intensity measuring device are changed in response to adjustment of the film sensitivity setting member 5.

The light intensity measuring device as shown in the illustrated embodiment is a well-known galvanometer 42 which is located in the circuit of a photocell 43. The photocell circuit also includes a balancing resistor 44. The needle 42a of the galvanometer appears in a viewing window 45 which is preferably located in the finder field or is mirrored into the finder in a well-known manner per se.

The said indicating or warning device is constituted as two movable, limiting lugs or members 46 and 47 which are also visible in the viewing window 45 and which cooperate with the needle 42a. The limiting members are adjustable as to their spacing and positions by means of control and transmission devices which are so arranged as to be correlated to the characteristic of the galvanometer 42. The control and transmission devices connect the limiting members 46 and 47 with the film sensitivity setting member 5, and by the said correlation with the galvanometer characteristic the limiting marks indicate or identify, by the space or region extending between them, the permissible operating range of the camera. This range or region is marked "B" in FIG. 4.

The two limiting members 46 and 47 are constituted as needles which are rotatably mounted and coaxial with the needle 42a of the galvanometer 42. A control device is associated with each of the two indicator members 46 and 47, to effect adjusting movement of such members in response to adjustment of the said fourth or film sensitivity setting member 5. Each of the control devices comprises a cam and a portion of the indicator member which cooperates with the said cam. The cams have the reference numerals 48 and 148, and are fixedly connected to a gear 49. For cooperation with the cams 48 and 148 the indicator members 46 and 47 have cam follower pins 50 and 150, whereas springs 51, 151 are connected with the indicator members 46 and 47 to maintain the cam follower pins in engagement with the cams. The springs 51 and 151 each have one end anchored, as indicated. The cams 48 and 148 are basically actuated by a cam 5b provided on the said fourth or film sensitivity setting member 5. The cam 5b is engaged by a cam follower pin 53 which is movable in a guide 52 and which cooperates with a bell crank 55 pivotally mounted about an axis 54. The movements of the bell crank 55 are transmitted by means of a pin 57 displaceable in a guide 56, to a gear 58 which meshes with the gear 49. A spring 60 is provided, disposed on the axis 59 of the gear 58 and biasing the latter counterclockwise, thereby to maintain a positive tensional driving connection between the gear 49 and the cam 5b.

In order reliably to insure a control of the above described kind, even when the operating range of the camera is still such as to permit the taking of a photograph but when a present exposure setting is no longer possible because the end of the operating range of the light intensity measuring device has been reached, the lower limit 45a of the viewing window 45 of the galvanometer 42 is so positioned that it covers the needle 42a when the lower operating limit of the galvanometer is reached.

An economical arrangement with respect to the devies for measuring the light intensity is effected if a single galvanometer, which is influenced by the existing light conditions, is used both to control the said third setting member 4 and also the indicator needle 42 constituting a part of the indicating and warning device. This may be effected by providing the movable coil 7 of the galvanometer 6 with a needle such as the needle 42a, in addition to the cams 9 and 13 which cooperate with the levers 10 and 12. The said needle will then be visible in the viewing window, or the position of the needle may be projected to a desired spot, as for example into the camera view finder, as by well-known optical means.

When the above described indicating and warning device is used, the operational simplicity and understanding of the camera may be increased still further by the provision of electrical signal lamps, in addition to the needle type indicator. In such case, a separate signal lamp would be associated with each of the indicator members 46 and 47, and the lamps would light up when a coincidence is effected between the needle 42 and the respective indicator member. In effecting a closing of the circuit, the indicator members 46 and 47 would be preferably constituted as flexible contact arms, against which the needle 42 would abut when the said coincidence is brought about. An indicating and warning device provided in this manner results in an exclusive "Yes"—"No" indication, especially if the indicating members 46 and 47 are not made to be visible.

The maximum light intensity which may occur and be utilized, as set forth in the illustrated embodiment of the invention, is presumed to be such that it can just be taken care of with the righest operating values of the camera, i.e., in the above table, the pair: 1/250 sec.—22 diaphragm at a film sensitivity setting of 22° DIN. Assuming now that it should be possible to take photographs at the highest light intensity, the film sensitivity range associated with the operating range of the camera ends at 22° DIN.

In order to be able to use more sensitive films with the camera, the two unitized speed and diaphragm setting members 1 and 2 are enabled to have an overpath or an extended range, within which the values of the diaphragm and speed associated with the upper limit of the operating range remain set or fixed. The size or extent of the said overpath or additional range is determined by the desired number of the film sensitivity values exceeding the film sensitivity limit.

To explain further, the film sensitivity scale in the illustrated embodiment of the invention extends to 31° DIN. Thus, the difference between 22° DIN is 9° DIN corresponding to three exposure values. The overpath or additional range of the said unitized or interconnected speed and diaphragm setting members 1 and 2 therefore also is made to equal three exposure values. This overpath or added range is indicated by the letter "S" in FIG. 1.

The magnitude of the diaphragm aperture and of the shutter speed can be kept constant for the said extended range or overpath of the setting members 1 and 2 in a manner known per se, by an appropriate shaping of the diaphragm and speed cams.

A selector means constituted as a lever 61 in the illustrated embodiment of the invention serves for alternately coupling the transmission member 32 either to the manually operable setting member 31 or else to the said third setting member 4 which is responsive to light conditions in its setting. The selector lever 61 is pivotally mounted about a stationary pin 62 provided on the camera case, and can be placed in two positions indicated as "auto" and "man." When the lever 61 is set at "auto," the transmission member 32 is connected to the said third setting member 4, and when the selector 61 is placed in the "man" position, the transmission member 32 is connected to the manually operable setting member 31. The coupling of the transmission member and the said setting members is effected by the above mentioned locking rail 34 which is shiftably mounted on the transmission member 32 and is cooperably connected to the selector lever 61 when the member 32 is at the starting position associated with the starting positions of the members 4 and 31 shown in FIG. 1.

The above described arrangement provides a particularly effortless, easily manipulable and understood selective operation of the camera as regards changing from an automatic exposure setting to a manual setting and vice versa. When the operator effects such a selection of the desired setting he has merely to make sure that the two setting members 4 and 31 are first in their starting positions, and to remember that the manually operable setting member 31 can be adjusted only when the selector lever 61 is in the "man" position indicating this kind of setting.

In order completely and reliably to insure fulfillment of these requirements, even independently of the operator, the invention further provides several locking devices one of which permits adjustment of the manually operable setting member 31 only if the selector 61 is in the "man" position, whereas the other locking device permits adjustment or shifting of the selector lever 61 from the "man" position to the "auto" position or vice versa only if both the manually operable setting member 31 and the member 4 are in their starting positions as shown in FIG. 1.

In the illustrated embodiment of the invention, the said locking devices have a common member which can be actuated by the selector member 61 and which is constituted as a locking rail 63. The locking rail 63 is displaceable in guides 64 and 65 provided on the camera, and has a pin-and-slot connection 61a, 66 with the lever 61. In order cooperably to connect the selector lever 61 to the coupling 34 of the transmission member 32, the locking rail 63 is provided with a recess 63a which is engaged by an arm 34a of the coupling rail. The locking rail 63 has at one of its ends two recesses 63b and 63c which are associated with the "auto" and "man" setting positions of the selector lever 61. A locking lever 68 which is pivoted about a fixed axis 67 provided on the camera cooperates with the recesses 63b and 63c. This cooperation is brought about when the said third setting member 4 is out of its starting position shown in FIG. 1. A projection 68a of the locking lever 68 is engageable under the action of a spring 69 biasing the lever 68 clockwise, with one of the recesses 63b or 63c, thereby to prevent a shifting of the selector lever 61. The locking lever 68 is released in response to the setting member 4 attaining its starting position, this being effected by a projection 4f provided on the said setting member 4 which is engageable with and swings the locking lever 68 counterclockwise to the position shown in FIG. 1.

To effect cooperation with the manually operable setting member 31, the locking rail 63 has on its other end a laterally extending lug 63d which is received in an angle-shaped slot 31d provided on the setting member 31.

The mode of operation of this arrangement is apparent from FIG. 1, and is such that the manually operable setting member 31 can only be adjusted when the selector lever 61 is in the "man" position. In addition, the selector lever 61 can be actuated only if the setting member 31 occupies its starting position as shown in FIG. 1.

The possibility of selecting a manual setting for the exposure has a number of advantages in photographic cameras having automatic exposure setting or regulation. More particularly, it insures that the camera may be utilized even if the automatic setting device is not in operation. It is moreover possible to take photographs even where the light conditions differ prior to and during the exposure. Flash photographs are, for example, a case in point.

A well-known brightness symbol scale 70 shown in FIG. 2 serves, in the illustrated embodiment of the invention, for setting the manually operable setting member in the case of daylight exposures. The representations of the individual symbols on said scale are adapted to the uniformly graduated exposure value series resulting from the correlation of the speed and diaphragm values of the members 1 and 2. Instead of the symbol scale 70, a scale with "genuine" light values may likewise serve for setting the manually operable setting member 31. However, the symbol scale has the advantage over the "genuine" light scale in that the setting of the manually operable setting member 31 can be effected directly by comparison of the actual exposure conditions symbolized shown on the scale.

The scale 70 in the embodiment of the invention is arranged on a fixed part of the camera, whereas the manually operable setting member 31 carries an index pointer or arm 31e arranged to cooperate with the said scale. The correlation of the scale 70 and the index arm 31e with the setting members 5 and 31 may also be effected conversely, that is, the index may be provided on the member 5 and the scale may be provided on the member 31.

For the purpose of taking flash photographs, the manually operable setting member 31 is arranged to have a special setting range beyond the range of the symbol scale 70 and for which a shutter speed suitable for flash exposures, as for example 1/30 sec., is provided. Such shutter speed may be correlated with the entire range of diaphragm values in the said additional setting range of the member 31. In this case, the shutter speed can be kept constant for the said diaphragm values in a manner known per se by appropriately shaping the shutter speed cam associated with the speed setting member. The setting of the manually operable setting member 31 in the case of flash exposures is effected through the use of a scale 71 having diaphragm values, which in the illustrated embodiment shown in FIGS. 1 and 2 is disposed on a fixed part of the camera and arranged to cooperate with the aforementioned index arm 31e. Two symbols in the form of a combustion flash bulb and a high voltage flash respectively are associated with the scale 71 to identify the purpose for which it is to be used. The same symbols are used in conjunction with the setting marking "man" for the selector lever 61.

In addition, two "B" setting marks are provided, for the purpose of effecting B-exposures as well as to permit a focusing check of the photographic objective, one of said markings being associated with the diaphragm value 2.8 whereas the other one is associated with the diaphragm value 22 (FIG. 2).

A further construction as provided by the invention is illustrated in FIG. 3, which shows a novel scale arrangement by which semi-automatic setting of the diaphragm for flash exposures may be effected in response to the type of flashbulb used and the photographic range or distance. For this purpose an auxiliary distance scale 72 and an identification mark scale of the flashbulb types 73 are arranged so as to be mutually adjustable and cooperable. It is possible selectively to arrange either the one scale on the setting member 5 and the other one on the manually setting member 31, or else to arrange both of the scales on one of these setting members, in each case the scales being relatively movable for adjustment. Where the scales are arranged respectively on two setting members, the members are adjusted to correlate the scales by adjusting the setting member 31 (and thereby adjusting the diaphragm) to a position corresponding to the type of flashbulb which is used and the photographic range of distance selected. Where the two scales are provided on one of the setting members, the other setting member has an index mark which is arranged to cooperate with one of the scales for range (distance) and identifying marks.

As illustrated in FIG. 3, the manually operable setting member 31 constitutes the carrier for the two scales 72 and 73, and the auxiliary range or distance scale 72 is disposed on a scale member 74 for the purpose of providing for relative adjustability of the two scales with respect to each other. The member 74 is relatively adjustable with respect to the manually operable setting member 31 by the use of a fingerpiece 75 on such member. The setting marking for the two scales 72 and 73 comprises an index finger 5c provided on the film sensitivity setting member 5 and an index mark 76 mounted on the member 74.

The identification mark scale 73 is constituted in a manner known per se as a sequence or set of well known guide values LZ (guide value equals diaphragm value times distance value in meters) for a film sensitivity of 17° DIN. In addition, the trade names of the flash lamps are associated with the guide values set forth on the scale. In a different manner, the trade names alone may be used as identifying marks, or the identifying marks may consist of symbols of different shapes or colors, as for example symbols of small or large flashlamps or a squence of other symbols of different colors, for instance, dots or bars.

The above described arrangement enables the setting of the diaphragm for flash exposures to be carried out in the easiest, simplest and most reliable manner imaginable. This is due to the fact that the only requirement for correctly setting the diaphragm consists in adjusting the manually operable setting member 31 until the range or distance which is set on the auxiliary range scale 72 is the same as that on the range or distance setting scale of the photographic objective.

As has already been mentioned, the setting member 4 includes a driving device, which in FIG. 1 is shown as a gear 14 and a rack 4b cooperable with the gear and provided with a spring. The said driving device is preferably stressed or cocked in response to the setting of the shutter or actuation of the film transport device of the camera, whereby the setting member can be secured by means of a retaining device in its starting position associated with the stressed condition of the driving device as shown in FIG. 1.

The retaining device comprises, as illustrated in FIG. 1, a locking pawl 760 which cooperates by means of a lug 76a with a locking recess 4g provided in the setting member 4. For a purpose of releasing the setting member 4, the pawl 760 can be actuated against the action of a spring 77 which biases it clockwise, this actuation being in response to the release operation of the camera. The connection with the camera release is indicated by the arrow 78. It can be put into effect in the form of any well known transmission device, or the button 760b may be considered as the camera release. However, for the purpose of insuring the completion of an automatic exposure setting prior to the opening of the shutter, as well as to avoid adverse effects on the result of the exposure of vibrations possibly occurring while the setting member 4 is running down there is further provided by the invention an arrangement involving a well-known delayed action mechanism which is releasable in response to or simultaneously with release of the camera or shutter. Through the use of such delayed action mechanism the opening of the shutter may be delayed by a specific period of time with respect to the release operation of the camera or the shutter, said period of time being so selected that the setting member 4 is enabled to travel the maximum extent of its adjusting movement.

In FIG. 1 a delayed action device D is illustrated, having a release lever arm L which is actuated in response to operation of the camera release 760b. The delayed action device has a control arm C which is connected to release the shutter drive mechanism, in this case illustrated as the driving disc DD of the shutter driving mechanism. Delayed action mechanisms of this type are used in well known shutters and cameras, for example, as synchronizing mechanisms for flashbulb ignition. The structure and mode of operation therefore need no further explanation.

The mode of operation and functioning of the camera as provided by the invention and described above, is briefly as follows:

(1) Film Sensitivity Setting

This setting is effected with the parts in the positions shown in FIG. 1, wherein the third setting member 4 and the manually operable setting member 31 are in their starting positions. The fingerpiece 18a is depressed, releasing the coupling connection 29, 33, 32a between the setting members 1, 2 and the transmission member 32. Such action also unlocks the locking means 18b, 19, whereupon the film sensitivity setting member 5 is shifted to bring the index pointer 27a opposite the sensitivity value on the scale 20 which correspond to the sensitivity of the film being used. This adjustment causes a simultaneous adjustment of the setting members 1 and 2 which control the shutter speed and the diaphragm.

(2) Operations Required of the Operator Prior to Taking of the Photograph

These operations are limited to selecting the desired kind of exposure setting (either automatic or non-automatic) by means of the selector lever 61. Also, it is necessary for the operator to check and ascertain whether or not the needle 42a of the galvanometer 42 is within the range indicated by the indicator members 46 and 47. If the needle is not within the said range, it means that the prevailing light intensity is either too low or too high to permit the taking of a photograph with an automatic exposure setting at the film sensitivity for which the setting member 5 has been adjusted.

(3) Taking of a Photograph With Automatic Exposure Setting

This is done by actuating the camera release 760b. This operation will release the locking pawl 760 which, in turn, releases the third setting member 4, permitting it to run down under the action of the driving means 4b, 14. Depending on the prevailing light intensity, the setting member 4 is halted after having travelled a shorter or longer path, by engagement of one of the steps of the stepped edge 4a with the lug 11a of the stop lever 11. The speed and diaphragm setting members 1 and 2 will by such action automatically attain a setting position which corresponds to the prevailing light intensity and to the preset film sensitivity. Operation of the camera release also places in operation the delayed action device D, thereby delaying the opening movement of the camera shutter until the adjusting movement of the setting member 4 has been completed. Upon this occurring, the delayed action device D will, through action of the control lever C, release the shutter mechanism driving disc DD, thereby to effect an opening of the shutter and an exposure.

(4) The Taking of a Photograph With the Manual Exposure Setting

For this purpose, the selector lever 61 is moved from the "auto" position to the "man" position (with the setting members 4 and 31 being in their starting positions as shown in FIG. 1), and the manually operable setting member 31 is thereby coupled with the transmission member 32. If the photograph to be taken is a daylight exposure, the setting member 31 together with the speed and diaphragm setting members 1 and 2 are now adjusted to an extent necessary to bring the needle indicator finger 31e opposite the symbol associated with the prevailing light intensity on the scale 70.

In the case of flash exposures on the other hand, the setting member 31 is set with the aid of the scale 71 (FIGS. 1 and 2) or with the aid of the auxiliary range and flashbulb identifying scales 72 and 73 (FIG. 3). In the embodiment of the invention shown in FIGS. 1 and 2, the diaphragm value which is to be set on the scale 71 by means of the setting member 31 must first be calculated in a manner known per se, from the available value for the photographic range and the flashlamp guide value, whereas such calculation can be dispensed with in the arrangement of FIG. 3. The setting of the diaphragm for flash-exposures in the latter case merely requires that the guide value of the flashbulb which is to be used, is set on the guide-value scale 73 by means of the mark 76, and that thereafter a coincidence be brought about and effected between the number of meters on the scale 72 corresponding to the photographic range selected and the setting mark 5c, by means of the manually operable setting member 31.

I claim:

1. In a photographic camera, in combination, diaphragm and speed setting members; means including a device fixedly coupling said members in a given relative position whereby during adjustment of the coupled setting members the camera diaphragm and speed values are correlated to define a closed setting range having uniform exposure gradations; a light-intensity measuring device; a third setting member; means for effecting automatic adjustment of said third setting member in accordance with the response of said measuring device to light conditions; means for releasably coupling the coupled diaphragm and speed setting members to the third setting member for automatic actuation thereby; a fourth setting member and indicator means associated with the same, relating to an addition exposure factor; and means responsive to adjustment of said fourth setting member, for actuating the said releasable coupling means and altering the relative coupled position of the diaphragm and speed setting members with respect to the third setting member thereby to include the additional exposure factor in the automatic adjustment of the speed and diaphragm setting members.

2. The invention as defined in claim 1, in which there are two means for locking the fourth setting member in its adjusted positions, and in which the means for actuating the releasable coupling renders inoperative one of said locking means subsequent to releasing the coupling, and in which the other locking means is rendered inoperative only when the third setting member is in a predetermined starting position.

3. The invention as defined in claim 2, in which the locking means have notched members and cooperable locking teeth, and in which the said indicator means comprises a film sensitivity scale having gradations equal in spacing to the spacing between the notches of the notched members.

4. The invention as defined in claim 1, in which there is a manually operable setting member and means alternately operative with said releasable coupling means for coupling said coupled speed and diaphragm setting members to said manually operable member whereby said speed and diaphragm setting members may be optionally adjusted either manually or automatically.

5. The invention as defined in claim 4, in which the said releasable coupling means and alternatively operable coupling means include a transmission member which is optionally connectable to either the third setting member or the manually operable setting member, and in which the means for altering the relative coupled position of the third setting member comprises an adjustable coupling which effects an adjustment of the speed and diaphragm setting members with respect to the transmission member.

6. The invention as defined in claim 5, in which there are three means for locking the fourth setting member in its adjusted positions, in which the said adjustable coupling renders inoperative one of said locking means subsequent to its release, and in which the other two locking means are rendered inoperative respectively only when the manually operable setting member and the said third setting member are in predetermined respective starting positions.

7. The invention as defined in claim 6, in which the three locking means have notched members and cooperable locking teeth, and in which the said indicator means comprises a film sensitivity scale having gradations equal in spacing to the spacing between the notches of the notched members.

8. The invention as defined in claim 1, in which there is a deflectable part movable in response to light conditions, and in which there is a cooperable warning indicator associated with and referrable to said part, and means for shifting said indicator in response to movement of said fourth setting member, thereby to enable an indication to be had of the suitability, for an automatic exposure setting utilizing the third setting member, of the setting of the said fourth setting member which determines the said additional exposure factor, in conjunction with existing light conditions.

9. The invention as defined in claim 8, in which there is a viewing window wherein the deflectable part moves, in which the warning indicator comprises two relatively movable indicator members disposed in the viewing window, in which there are control devices connecting the indicator members with the said fourth setting member and regulating the spacing and positioning of the indicator members with reference to a light measuring device characteristic with which the control devices are correlated so that the range bounded by the indicator members indicates the permissible range of the deflectable part for which light conditions are suitable for the use of an automatic exposure setting utilizing the said third setting member.

10. The invention as defined in claim 9, in which the light intensity measuring device comprises a galvanometer for actuating the said deflectable part, said galvanometer having the characteristic with which the control devices are correlated.

11. The invention as defined in claim 1, in which the diaphragm and speed setting members shiftable in an overpath disposed beyond the said closed setting range, for which overpath the diaphragm and speed values associated with the upper limit of the said closed range hold, in which the said indicator means comprises a film sensitivity scale having additional sensitivity values corresponding to ultra-sensitive films, and in which the extent of the said overpath is commensurate with the number of the said additional film sensitivity values.

12. The invention as defined in claim 5, in which there is a selector member having a fixed location, said selector member being settable in either of two positions, and in which there are means responsive to movement of the selector member actuating said releasable coupling means and said alternately operable coupling means to connect either said third setting member or the manually operable setting member to said transmission member.

13. The invention as defined in claim 12, in which there is a locking means controlled by the selector member, which locks the manually operable setting member in a predetermined starting position when the selector member is in one of the said two positions.

14. The invention as defined in claim 12, in which there are means controlled by the manually operable and said third setting members for locking the selector member against movement in either one of its two positions when either of the said setting members are out of their respective starting positions.

15. The invention as defined in claim 4, in which there is an indicator means including a light-condition scale and cooperable index member associated with the said fourth setting member and said manually operable setting member.

16. The invention as defined in claim 4, in which the manually operable setting member has a partial range of movement suited for flash exposures, for which partial range the speed and diaphragm setting members when coupled with the manually operable setting member provide a shutter speed suited for flash exposures throughout the entire range of diaphragm values.

17. The invention as defined in claim 16, in which there are indicator means associated with the manually operable setting member and the said fourth setting member and responsive to relative movement between said members, for effecting distance settings for different flash bulb types, said indicator means comprising a distance scale and a flashbulb-type scale, the latter being movable with respect to the distance scale and being cooperable therewith.

18. The invention as defined in claim 1, in which there is a manually operable release member for effecting the exposure, and in which there is a delayed action device connected with the shutter mechanism and actuated in response to movement of said release member, for delaying the opening of the shutter until after the said third setting member has been automatically adjusted.

References Cited in the file of this patent

UNITED STATES PATENTS 2,969,004    Gebele  ---------------- Jan. 24, 1961